June 19, 1956   A. S. BEAM ET AL   2,750,676

MASTER GAUGE FOR BEVEL GEARS

Filed Nov. 1, 1954

INVENTORS

United States Patent Office 2,750,676
Patented June 19, 1956

2,750,676

MASTER GAUGE FOR BEVEL GEARS

Albert S. Beam, Detroit, and Clarence B. Stapleton, Royal Oak, Mich., assignors to Vinco Corporation, Detroit, Mich., a corporation of Michigan Application November 1, 1954, Serial No. 466,182

3 Claims. (Cl. 33—179.5)

This invention relates to a bevel gear checking master and especially to a checking master for use in a gear inspection device and in the manner disclosed in our Patent No. 2,689,410 entitled "Master Gauge for Bevel Gears." This master gauge is used to check the concentricity and location of pitch cone, runout, backlash and tooth contact or bearing conditions of bevel gears. The runout test covers the composite effect of errors in any gear element, including tooth profile, spacing, concentricity of pitch diameter, helix angle and tooth spirals.

While the use of bevel gears is very common, no satisfactory equipment was formally available for accurate and conclusive inspection. Hence, the production of bevel gears is usually followed by a mating process in which a particular set of bevel gears is selected to run well together. This sometimes requires a run in period, or even lapping or burnishing in order to get the desired results, and, in any event, complicates production, assembly and replacement.

It is the principal object of our invention to overcome this difficulty and to provide for a fully rotatable master gauge that may be used to check production bevel gears in order to determine if they come within specified tolerances so that they can be used on an interchangeable basis.

When a bevel gear checking master is constructed according to our invention, it is not, as in the case of a spur gear checking master, an extremely precise rendering of the gear to be mated to the gear being checked. It is instead a conjugate crown gear corresponding to the basic spherical rack of the production bevel gear being checked. The teeth of this master gear may be straight or curved, depending upon whether the bevel gear being checked is of the straight, spiral, zerol or hypoid type.

The theory of bevel gears has been well known for many years. We have constructed a bevel gear checking master which represents the theoretical spherical rack or crown gear used as the basis of generating the bevel gear in question; thus, previous difficulties in producing accurate master bevel gears are avoided since the tooth surfaces of a crown gear represent simple geometric elements such as planes or cones and, therefore, can be accurately produced and readily inspected.

In the case of straight bevel gears, the straight sided tooth of the bevel gear checking master can be produced as easily as a similar straight sided tooth of a straight rack. It is to be observed that the bevel gear checking master, though in the form of a crown gear, cannot be accurately termed a crown gear because the ratio of its pitch circumference to its circular pitch is not necessarily an integral number. In the theoretical spherical rack of mating bevel gears, the pitch radius of the rack is established by the shaft angle and the pitch radii of the mating gears. Hence, the pitch circumference of the theoretical crown gear does not necessarily comprise an integral number of circular pitches. When this is true, the resulting master gear is incapable of turning a full 360° when in mesh with the production gear as there will be interference between the teeth.

In our co-pending application we disclosed a master gear that was made fully rotatable by eliminating a number of contiguous teeth so that the interference was compensated for by, in effect, a gap or slot in the toothed surface of the master gear. However, the result of making a gap in the toothed surface of the master gear was that the gears were completely out of mesh when the production gear ran over this gap. This meant that the production gear could be accidentally rotated so that when it again came into mesh with the master gear, it was possible that the same teeth of the production gear were in engagement with the master gear as before the production gear ran over the gap. This could result in that some of the teeth might be inspected twice while others might escape inspection entirely. In order to overcome this difficulty, we propose to make a number of teeth of the master gear more narrow than the teeth of the gear being checked so that interference is eliminated while still maintaining a partial meshing engagement.

We propose further to place positioning or centering teeth on the master gear on each side of the section containing the narrow teeth in order that the production gear will again regain perfect meshing engagement with the master gear after running over the section containing the contiguous narrow teeth.

The use of a bevel gear checking master in the form of a crown gear allows an arrangement of a checking fixture in which the direction of force exerted on the crown gear by irregularities in the bevel gear is axial and not, as it would be with a master in true bevel gear form, oblique, thus greater sensitivity to errors in the production gear can be had when the master gear is used on an inspection device and in the manner disclosed in my previously mentioned co-pending application.

For further understanding of our invention, reference is made to the accompanying drawings, in which.

Figure 1:
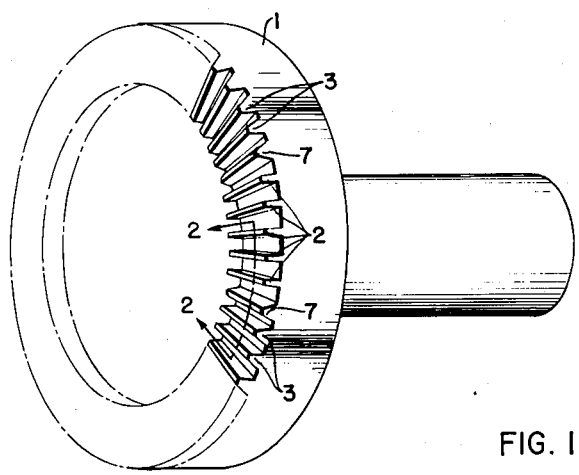
Fig. 1 is a perspective view of a bevel gear checking master constructed according to our invention.
Figure 2:
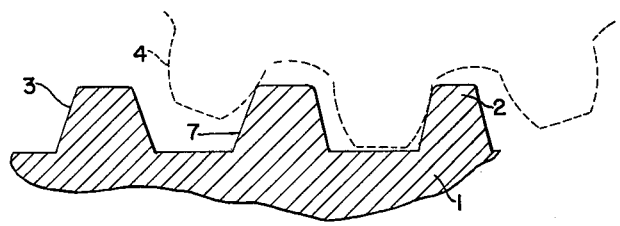
Fig. 2 is a partially developed sectional view of Fig. 1 taken along line 2—2 showing the bevel gear checking master in engagement with a portion of a bevel gear to be checked.

The bevel gear checking master 1 of Fig. 1 is mounted in an inspection device as shown in our co-pending application. In order to check for runout, it is necessary that the master gear be rotated. Since these master gears are not in fact crown gears, it is only chance if the circumference of the crown gear divided by the circular pitch yields an integral number. A master gear or checking master in which the circumference divided by the circular pitch does not yield an integral number can not be rotated 360° with a gear to be checked unless compensation is made for the resulting interference between the meshing teeth. This can be done by either eliminating a number of teeth in the master gear as was disclosed in our co-pending application or according to this invention, by making a number of pseudo-teeth on the master gear, each narrower than a true master tooth conjugate to the gear to be checked. Pseudo-teeth 2 of the master gear 1 are therefore made narrower than true teeth 3 in order to compensate for the resulting interference when in mesh with a production bevel gear denoted in Fig. 2 by the dotted lines. Teeth 3 are conjugate to the teeth of the bevel gear to be checked. The number of narrow teeth that are necessary depends principally upon the pitch cone angle of the production gear to be checked. A greater number of narrow teeth are required as the pitch cone angle increases because a larger pitch cone angle results in a larger pitch diameter of the end part and, consequently, more tooth engagement. By permitting the master gear to rotate 360°, more standard teeth may be utilized for checking than when the gear does not rotate completely. Of course, if the gear has a gap in the teeth as shown in our Patent No. 2,689,410, then the same number of standard teeth may be utilized for checking the gear as in the narrow teeth form of the invention.

In order that the teeth 3 of the master gear may mesh perfectly with the teeth 4 of the production gear after the production gear has run through the portion containing narrow pseudo-teeth 2, we provide for two centering pseudo-teeth which have a round periphery and which are placed one on each side of the portion containing the narrow teeth. It is seen from Fig. 2 that after the bevel gear or production gear has run through the portion containing the narrow teeth, that it may be out of phase or mesh with the master gear. However, when tooth 7 comes in contact with the sides of teeth 4 of the bevel gear, it will position the gears so that succeeding tooth 3 will be in perfect mesh with the teeth 4. Centering pseudo-tooth 7 is characterized in that the area above its pitch line is rounded so that when the tooth comes in contact with the teeth of the gear to be checked, it will move along the surface of these teeth until it engages two of them at their pitch line. It is important in order to accurately center or position the bevel gear or production gear for perfect meshing with the master gear, that the thickness of pseudo-teeth 7 at the pitch line be the same as the thickness of the master teeth 3.

While the narrow pseudo-teeth 2 of the master gear 1 are shown substantially square, it is to be understood that they may have a more rounded form in order to prevent scratching of the sides of the teeth of the production gear. Similarly, centering pseudo-teeth 7 could take on a different shape from that shown. They could have a more elliptical shape at their outer ends with the only limitation being that their thickness at the pitch line be the same as that of teeth 3.

We claim:

1. A bevel gear checking master in the form of a toothed crown wheel corresponding to the basic spherical rack of a bevel gear to be checked wherein a minor portion of contiguous teeth of said checking master are of substantially less thickness than a major portion of the teeth of said checking master.

2. A bevel gear checking master according to claim 1 wherein the tooth adjacent each side of said minor portion has its outer edges rounded.

3. A bevel gear checking master in the form of a toothed crown wheel corresponding to the basic spherical rack of a bevel gear to be checked, said checking master having a number of contiguous teeth of narrower thickness than the teeth of said bevel gear being checked to permit free meshing rotation of said bevel gear with said checking master without interference from said checking master.

No references cited.